United States Patent [19]

Mahdjuri Sabet

[11] Patent Number: 4,523,578
[45] Date of Patent: Jun. 18, 1985

[54] SOLAR RADIATION COLLECTOR

[76] Inventor: Faramarz Mahdjuri Sabet, via S. Sebastiano 33, I-24100 Bergamo, Italy

[21] Appl. No.: 403,421

[22] Filed: Jul. 30, 1982

[30] Foreign Application Priority Data

Aug. 4, 1981 [GB] United Kingdom ............... 81283829
Apr. 14, 1982 [GB] United Kingdom ................ 8210819

[51] Int. Cl.³ ................................................. F24J 3/02
[52] U.S. Cl. ..................................... 126/443; 126/433
[58] Field of Search ................................. 126/443, 433

[56] References Cited

U.S. PATENT DOCUMENTS 4,080,954  3/1978  de Wilde et al. .................... 126/443
4,119,085  10/1978 Knowles et al. .................... 126/443
4,331,131  1/1982  Sabet ................................... 126/443

FOREIGN PATENT DOCUMENTS 61548  5/1981  Japan .................................. 126/443

Primary Examiner—Carroll B. Dority, Jr.

[57] ABSTRACT

In a solar radiation collector comprising a glass envelope 1 around an absorber plate 2 mounted on a metal tube 3 communicates with a heat exchange condenser 6, the glass envelope is sealed around the metal tube using an intermediate metal collar 4. The collar is sealed at one end around the tube 3 and, at its other end, its thickness tapers to a knife edge and the glass is sealed to the inside of the knife edge.

8 Claims, 5 Drawing Figures

SOLAR RADIATION COLLECTOR

This invention relates to a solar radiation collector, i.e. a device which absorbs radiant solar energy and transfers it as heat to a heat transfer fluid which is circulated therethrough.

A known form of solar collector comprises a simple flat plate, for example of black printed aluminum roll bond or similar plate, which absorbs radiant solar energy. In contact with the plate is a metal tube through which heat transfer fluid is circulated. The radiant energy absorbed by the plate passes to the fluid in the form of heat. To improve the efficiency of the device, the plate is sealed in an evacuated glass tube, the metal tube passing out of the glass tube though a seal.

In the construction of such collectors, there is a problem in providing a vacuum-tight seal between the glass tube and the metal tube. The problem of metal-glass sealing is mainly due to the different physical properties of the two materials, in particular the large difference in the coefficient of expansion of the metal and normal glasses. There is a wide range of special glasses available whose expansion coefficients closely match those of common metals, but for ordinary commercially available glasses, such as borosilicate or soda glass, there are unfortunately no commonly available metals with similar expansion properties.

In order to use borosilicate or other commercial glasses, several glass rings which each have a slightly different expansion coefficient, are used to bridge between the metal and the commercial glass. This multi-step sealing technique is quite expensive when applied to solar collectors, and furthermore the seal produced tends to be very sensitive to mechanical shocks such as occur during transportation.

I have now devised a way of satisfactorily sealing glass to a metal tube which is useful particularly, in the construction of solar collectors.

In order to make it possible to have direct sealing between commercially available glasses and metals, the physical character of glass has to be considered. Since the compressive strength of glass (6000–12000 kg/cm$^2$) is generally several times larger than its tensile strength (300–800 kg/cm$^2$), the stresses of a metal tube with higher expansion coefficient are not compensated if the glass is fused to the external surface of the metal tube. However, if the glass is sealed to the inside surface of a metal tube of high expansion, the stresses will be largely compressive. According to one feature of the invention, therefore, the glass is sealed to the inside surface of the metal tube. Furthermore, the thickness of the tube should be reduced and, according to a further feature of the invention, the thickness of the tube is reduced in the end portion to a knife edge, preferably with a taper angle of less than 10°. Preferably also, the end of the metal tube is flared outwardly.

In this way, ordinary commercially available glasses can be sealed to metal tubes in solar collectors, even when the metal tube has a coefficient of thermal expansion which is much greater than that of the glass.

In one aspect, the invention provides a solar collector which comprises a radiation-absorbing plate and at least one metal tube for containing a heat transfer medium, the plate being in thermal contact with the tube and being enclosed within a radiation-transparent glass envelope sealed in vacuum-tight fashion, through a metal collar, to said tube; wherein the collar is of a generally truncated conical shape, the smaller diameter end being sealed around the periphery of the metal tube, and the larger diameter end being sealed to the glass envelope, and wherein the thickness of the collar reduces at the larger diameter end portion to terminate in a knife edge and the glass is sealed to the inside of said portion.

In order that the invention may be more fully understood, reference is made to the accompanying drawings, wherein.

Figure 1:
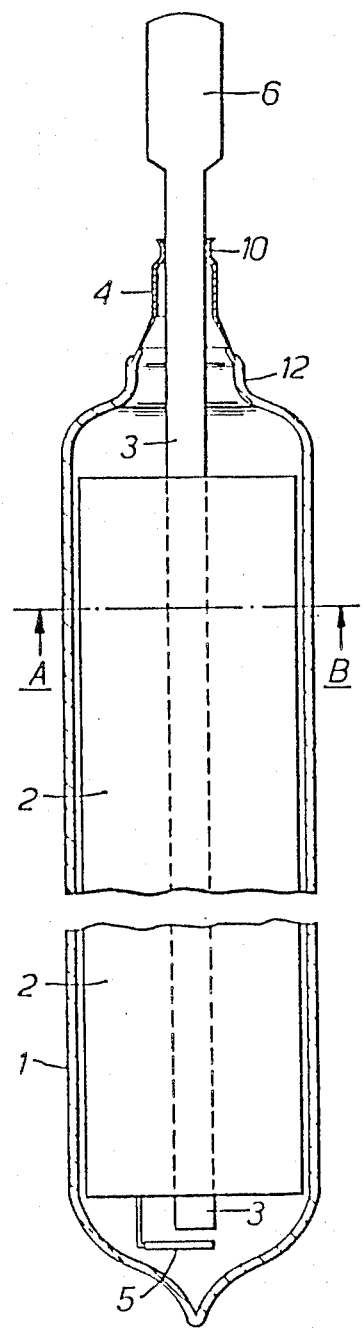
FIG. 1 is a longitudinal axial sectional view of one form of solar collector of the invention.
Figure 1A:
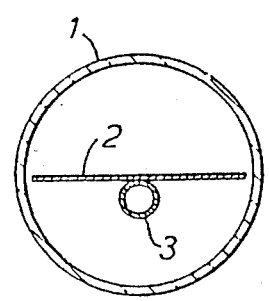
FIG. 1A is a section on the line A–B of FIG. 1.

Referring to FIGS. 1 and 2, the solar collector comprises an evacuated glass envelope or tube 1, within which is mounted an absorber plate 2 with metal tube 3, for heat transfer fluid, bonded to the rear face of plate 2. A vacuum getter plate 5 is provided at one end of tube 1, and at the other end of tube 1 a metal collar 4 seals the tube around the periphery of tube 3. A heat exchange system 6 is provided externally of tube 1 to remove heat from the transfer fluid in tubes 3. The tube 1 is made of soda glass but the end portion 12 adjacent the collar is preferably of lead glass, sealed to the soda glass.

Figure 2A:
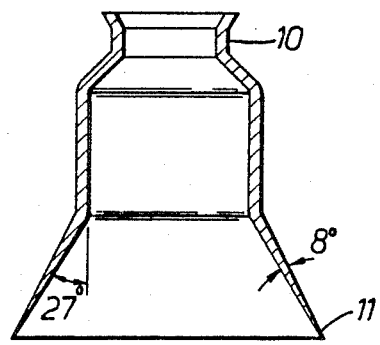
FIG. 2A is a section through the metal collar 4 used in FIG. 1.
Figure 2B:
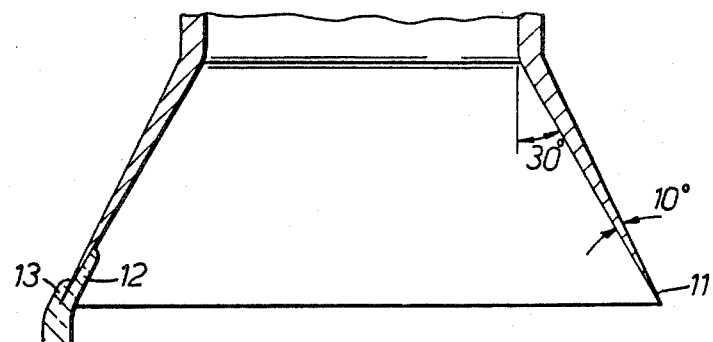
FIG. 2B is an enlarged view of part of the collar fused to the glass.

FIGS. 2A and 2B show the metal collar which is of generally truncated conical shape, the smaller diameter portion 10 being welded or soldered to tube 3. The larger diameter end portion which, as shown is flared outwardly at an angle of 10° to 30°, reduces in wall thickness to a knife-edge end 11. The reducing wall-thickness taper is about 8°.

As FIG. 2B shows, the end 12 of the lead glass tube is fused to the inside surface of knife-edge 11. This may be effected by first heating and tapering the end of the tube 12 until it enters the end of the collar. Heat is then applied to the metal collar as well as to the glass, and the two tubes are revolved rapidly in order to bring the hot glass into intimate contact with hot metal by centrifugal force. Using a copper (expansion coeff. $16.2 \times 10^{-6}$) tube or collar, it is possible to join it with this technique to soft lead and also soda glasses with linear thermal expansion coefficient of $9\text{-}10 \times 10^{-6}$, easily and even to hard glasses of the borosilicate type with thermal coefficients as low as $3 \times 10^{-6}$. Glass is preferably tooled over the edge of the copper to protect it (13). The glass is substantially strain-free a fraction of a millimeter away from the joint, but a narrow band of compression exists between the metal and this strain-free glass. Small areas of more highly-strained glass occur due to differences in thickness of the copper and oxide layer, and whilst these stresses are compressive (since the glass is attached to the inside surface of the metal of higher expansion) they can result in cracks in the joint zone, the cracks tending to increase the size with fluctuations in temperature. The formation of such cracks can be avoided by coating the copper with one or more other metals such as Ag, Ni, Cr or Co, or a mixture of two or more of these.

For the physical joint of copper to glass, the surface of copper has to be cleaned, etched and borated (by treatment with a saturated borax solution) accordingly. Besides copper, other alloys such as Ni-Fe, Cr-Fe, Cr-Fe-Co, and Kovar (Ni-Fe-Co), and stainless steel, can be used, for example. The metals should be oxygen-free, i.e. free of gaseous oxygen.

Figure 3:
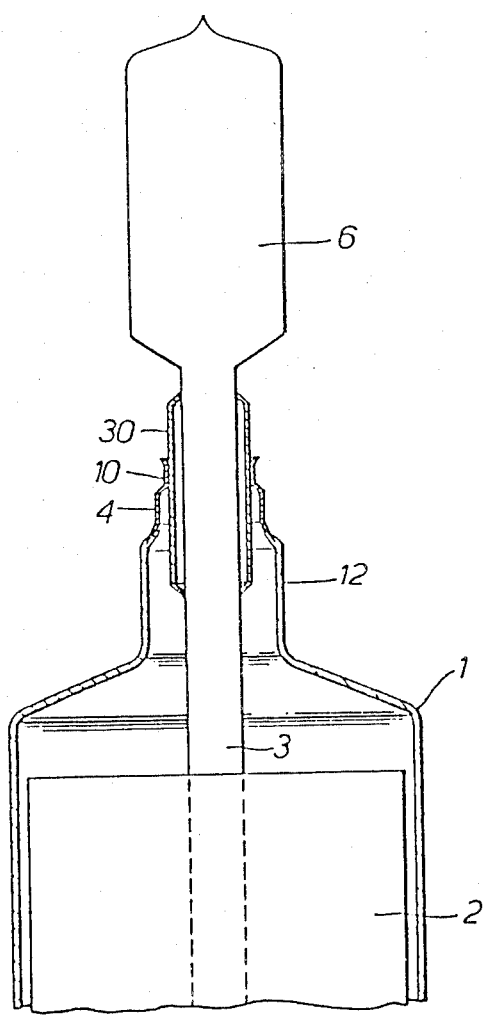
FIG. 3 is a longitudinal axial sectional view of one end of a portion of a solar collector of the invention which is similar to that of FIG. 1.

FIG. 3 shows part of a solar collector of the invention which is essentially the same as that in FIG. 1 (and like numerals show like parts) except that a metal sleeve 30 is provided around the metal tube 3. The sleeve 30 functions as a thermal shock absorber in that it is made of stainless steel (or another metal having a lower thermal conductivity than the metal tube 3) and is spaced along its length from the metal tube 3. Because of its relatively low heat transfer properties, any sudden changes in temperature of the tube 3 are communicated only slowly to the junction between collar 4 and the end portion 12 of glass envelope 1. Collar 4 is sealed to sleeve 30, such as by soldering or welding.

I claim:

1. A solar collector which comprises a radiation-absorbing plate and a tube assembly having at least one metal tube for containing a heat transfer medium, the plate being in thermal contact with the tube and being enclosed within a radiation-transparent glass envelope sealed in vacuum-tight fashion, through a metal collar, to said tube assembly; wherein the collar includes a portion of truncated conical shape, the smaller diameter end being sealed around the periphery of the metal tube assembly by a cylindrical portion, and the large diameter end being sealed to the glass envelope, and wherein the thickness of the collar reduces at the larger diameter end portion to terminate in a knife edge and the glass is sealed to the inside of said larger diameter end portion and not to the outside of the larger diameter end portion.

2. A solar collector according to claim 1, wherein the taper angle of the collar, as it reduces in thickness to a knife edge, is less than 10°.

3. A solar collector according to claim 1, wherein the smaller diameter end of the collar is soldered or welded to the tube assembly.

4. A solar collector according to claim 1 wherein the tube assembly further comprises a metal sleeve being sealed at one or both ends to the metal tube and spaced therefrom between its ends, and wherein the smaller diameter end of the metal collar is sealed around the periphery of the sleeve of said tube assembly.

5. A solar collector according to claim 4, wherein the metal tube is of copper and the metal sleeve is of stainless steel.

6. A solar collector according to claim 1, wherein the collar is of copper or copper alloy, or one of the alloys: Ni/Fe, Cr/Fe, Cr/Fe/Co, Ni/Fe/Co, or stainless steel.

7. A solar collector according to claim 1, wherein the glass envelope is of soft soda or lead glass, or of hard borosilicate glass.

8. A solar collector which comprises a radiation-absorbing plate and a tube assembly having at least one metal tube for containing a heat transfer medium, the plate being in thermal contact with the tube and being enclosed within a radiation-transparent glass envelope sealed in vacuum-tight fashion, through a metal collar, to said tube assembly; wherein the collar contains a frusto-conical portion and a cylindrical portion connected to a smaller diameter portion of the frusto-conical portion, the smaller diameter end being sealed around the periphery of the metal tube assembly, and the larger diameter end being sealed to the glass envelope, and wherein the thickness of the collar reduces at the larger diameter end portion to terminate in a knife edge and the glass is sealed to the inside of said larger diameter end portion and not to the outside of the larger diameter end portion.

* * * * *